United States Patent
Tanaka et al.

(10) Patent No.: US 9,823,599 B2
(45) Date of Patent: Nov. 21, 2017

(54) LIGHT GUIDE BODY, STATIC ELIMINATION DEVICE, AND IMAGE FORMING APPARATUS

(71) Applicant: FUJI XEROX CO., LTD., Tokyo (JP)

(72) Inventors: Hirotaka Tanaka, Ebina (JP); Tsutomu Sugimoto, Ebina (JP); Jin Iwasaki, Ebina (JP); Ken Ozaki, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/211,806

(22) Filed: Jul. 15, 2016

(65) Prior Publication Data

US 2017/0199479 A1  Jul. 13, 2017

(30) Foreign Application Priority Data

Jan. 13, 2016  (JP) .................. 2016-004073

(51) Int. Cl.
| | |
|---|---|
| *G03G 15/04* | (2006.01) |
| *G03G 15/045* | (2006.01) |
| *H04N 1/028* | (2006.01) |
| *H04N 1/00* | (2006.01) |
| *H04N 1/29* | (2006.01) |
| *F21V 8/00* | (2006.01) |
| *G02B 1/16* | (2015.01) |

(52) U.S. Cl.
CPC ............ *G03G 15/045* (2013.01); *G02B 1/16* (2015.01); *G02B 6/001* (2013.01); *G02B 6/0096* (2013.01); *H04N 1/00994* (2013.01); *H04N 1/0285* (2013.01); *H04N 1/02855* (2013.01); *H04N 1/29* (2013.01); *H04N 2201/0082* (2013.01); *H04N 2201/0246* (2013.01); *H04N 2201/02456* (2013.01); *H04N 2201/02462* (2013.01)

(58) Field of Classification Search
USPC ............................................ 399/177
See application file for complete search history.

(56) References Cited

U.S. PATENT DOCUMENTS

| | | | | |
|---|---|---|---|---|
| 4,422,719 A * | 12/1983 | Orcutt | ............... | B29D 11/00711 362/562 |
| 4,688,892 A * | 8/1987 | Laakmann | ............. | G02B 6/102 385/125 |
| 5,542,017 A * | 7/1996 | Koike | ....................... | G02B 6/00 362/33 |
| 6,851,844 B2 * | 2/2005 | Guy | ....................... | D03D 15/00 362/556 |
| 2013/0194641 A1 * | 8/2013 | Ouchi | .................. | G02B 6/0001 358/484 |

(Continued)

FOREIGN PATENT DOCUMENTS

JP   2015-141376 A   8/2015

*Primary Examiner* — Rodney Fuller
(74) *Attorney, Agent, or Firm* — Oliff PLC

(57) ABSTRACT

A light guide body that extends in a rod shape and guides light incident from an end surface thereof to emit the light from a circumferential surface thereof, the light guide body having a shape such that according to an angle of a circumferential direction around the light guide body, an amount of emitting light in a direction of the angle is different. Additionally, a static elimination device and an image forming apparatus include the light guide body.

4 Claims, 8 Drawing Sheets

(56) References Cited

U.S. PATENT DOCUMENTS

| | | | |
|---|---|---|---|
| 2013/0314940 A1* | 11/2013 | Russert | C03B 37/01222 362/556 |
| 2014/0092620 A1* | 4/2014 | Tissot | G02B 6/0003 362/553 |
| 2014/0241002 A1* | 8/2014 | Lin | G02B 3/0056 362/551 |
| 2015/0009653 A1* | 1/2015 | Dunn | G02F 1/133615 362/97.1 |
| 2015/0160394 A1* | 6/2015 | Nakano | G02B 6/001 349/65 |
| 2015/0198758 A1* | 7/2015 | Yamamura | H04N 1/02835 358/474 |
| 2016/0212293 A1* | 7/2016 | Ohzawa | H04N 1/04 |
| 2016/0299276 A1* | 10/2016 | Yamamoto | G02B 1/046 |

* cited by examiner

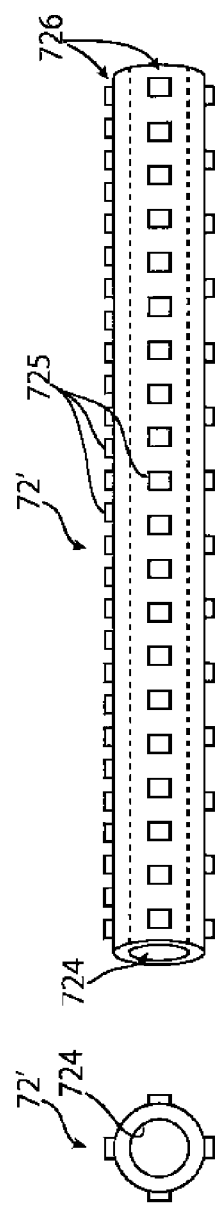

FIG.8

| NUMBER OF PRINT COPIES | ANGLE |
|---|---|
| 0 | 0° |
| 100,000 | 45° |
| 200,000 | 90° |
| 500,000 | 135° |
| 1,000,000 | 180° |

LIGHT GUIDE BODY, STATIC ELIMINATION DEVICE, AND IMAGE FORMING APPARATUS

CROSS-REFERENCE TO RELATED APPLICATIONS

This application is based on and claims priority under 35 USC 119 from Japanese Patent Application No. 2016-004073 filed on Jan. 13, 2016.

BACKGROUND

1. Technical Field

The present invention relates to a light guide body, a static elimination device, and an image forming apparatus.

2. Related Art

There is known a static elimination device which emits light to a photoconductor in order to remove a remaining electrostatic of the photoconductor so as to neutralize the photoconductor.

SUMMARY

According to an aspect of the present invention, there is provided a light guide body that extends in a rod shape and guides light incident from an end surface thereof to emit the light from a circumferential surface thereof, the light guide body having a shape such that according to an angle of a circumferential direction around the light guide body, an amount of emitting light in a direction of the angle is different.

BRIEF DESCRIPTION OF THE DRAWINGS

Exemplary embodiment(s) of the present invention will be described in detail based on the following figures, wherein:

FIGS. 6A and 6B are a side view and a front view, respectively illustrating a light guide body according to another exemplary embodiment of the present invention;

FIG. 8 is a diagram illustrating a table which is stored in a main controller for adjusting an angle of the light guide body.

DETAILED DESCRIPTION

Hereinafter, an exemplary embodiment of the present invention will be described.

Figure 1:
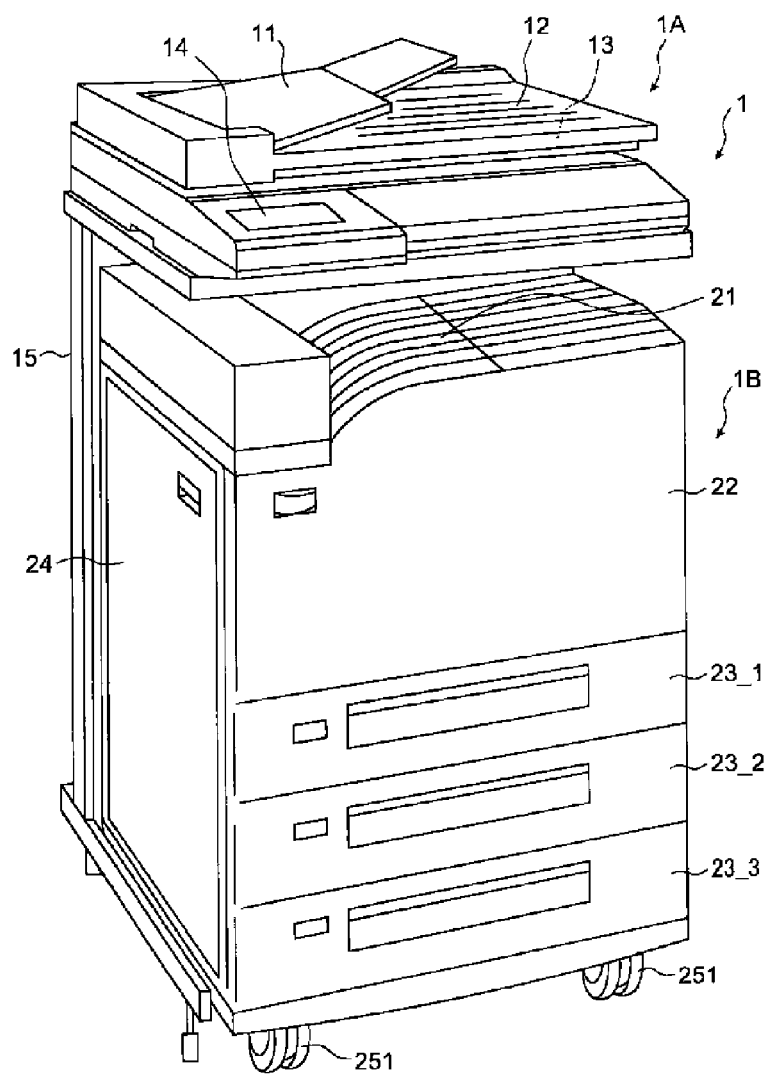
FIG. 1 is a perspective external view of a copier which is an exemplary embodiment of an image forming apparatus according to the present invention.

FIG. 1 is a perspective external view of a copier which is an exemplary embodiment of an image forming apparatus according to the present invention. The copier 1 includes a static elimination device and a light guide body according to exemplary embodiments of the present invention.

The copier 1 includes a document reading portion 1A and an image forming portion 1B.

In the document reading portion 1A, there is provided a document feeding tray 11 on which the documents are placed in an overlapping state. The documents placed on the document feeding tray 11 are fed out one by one. Characters and images recorded on the documents are read, and then the documents are discharged onto a document discharge tray 12.

The document reading portion 1A includes a hinge extending in a left-right direction on a rear side. The document feeding tray 11 and the document discharge tray 12 can be integrally lifted up about the rotation center of the hinge. A wide document reading plate 13 (see FIG. 2) made of transparent glass is provided below the document reading portion. In the document reading portion 1A, the character and the image can also be read from the document on the document reading plate 13 such that the document is placed one by one facing downward on the document reading plate 13 instead of placing the document on the document feeding tray 11.

On the front side of the document reading plate 13, there is provided a display operation unit 14 which displays various messages for the user and various operation buttons and receives user's operation such as an instruction of document read and image formation.

The entire document reading portion 1A is supported by a support frame 15.

The image forming portion 1B includes a discharge tray 21 to which a sheet with an image formed thereon is discharged. In the front surface of the image forming portion 1B, there is provided with a front cover 22 which is openable to replace an inner component such as a toner container and to remove a sheet jammed in the middle of transportation. A drawer type of three sheet feeding trays 23_1, 23_2, and 23_3 are provided below the front cover 22. The sheets before the image formation are contained in the sheet feeding trays 23_1, 23_2, and 23_3 in a stacked state.

A side cover 24 is provided in the left side surface of the image forming portion 1B, and openable to remove a sheet which is jammed in the middle of transportation.

Wheels 251 are attached to the bottom surface of the image forming portion 1B to make the image forming portion 1B movable.

Figure 2:
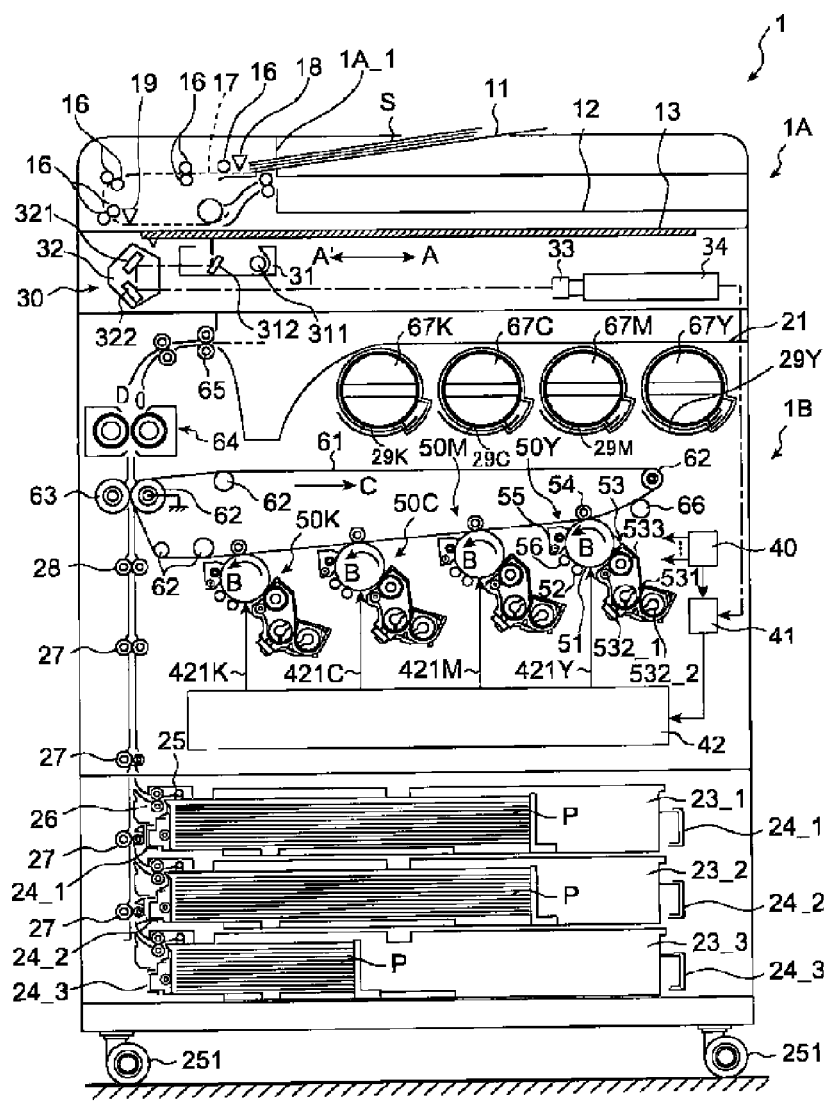
FIG. 2 is a diagram illustrating an inner configuration of the copier of FIG. 1.

FIG. 2 is a diagram illustrating an inner configuration of the copier of FIG. 1.

A document reading optical system 30 is disposed below the document reading plate 13 made of transparent glass. The document reading optical system 30 includes a first block 31 containing therein a lamp 311 and a mirror 312, a second block 32 containing therein two mirrors 321 and 322, and a photoelectric sensor 33 which reads the light reflected on the image to generate an image signal.

The first block 31 and the second block 32 are movable in a direction of arrow A-A' along the document reading plate 13, and positioned on the left in FIG. 2 at an initial state.

A document S placed on the document feeding tray 11 is fed one by one, and transported by a transport roller 16 along a transport path 17 which abuts on the document reading plate 13. When being transported while abutting on the document reading plate 13, the document S is irradiated by the lamp 311. The reflected light from the document S is reflected on the mirrors 312, 321, and 322 and read by the photoelectric sensor 33. The image signal representing the character and the image recorded in the document S is generated. The document S irradiated by the lamp 311 is further transported and fed out onto the document discharge tray 12.

When the document is placed on the document reading plate 13, the first block 31 and the second block 32 move in a direction of arrow A in order to keep an optical distance always constant between the reading position of the document on the document reading plate 13 and the photoelectric sensor 33. Meanwhile, the lamp 311 emits the light to the document. The photoelectric sensor 33 reads the image of the character and the image on the document, and converts the image into the image signal.

The image signal obtained by the photoelectric sensor 33 is input to an image processing unit 34. The image signal obtained by the photoelectric sensor 33 is an image signal representing colors of R (red), G (green), and B (blue). The image processing unit 34 converts the image signal of RGB into image data configured with four colors of Y (yellow), M (magenta), C (cyan), and K (black), and temporarily stores the image data. Then, the image data is transmitted to an exposure controller 41 in synchronization with a timing of exposure for forming an electrostatic latent image as described below.

The image forming portion 1B includes an exposure unit 42. When the latent image is formed, the image data of Y, M, C, and K is sent from the exposure controller 41 to the exposure unit 42. Exposure light beams 421Y, 421M, 421C, and 421K are modulated by the respective image data of Y, M, C, and K and emitted from the exposure unit 42.

A main controller 40 is illustrated at a position adjacent to the exposure controller 41 in FIG. 2. The main controller 40 is configured with a microcomputer and a program which is executed by the microcomputer. The main controller 40 is connected to the exposure controller 41, the display operation unit 14 (see FIG. 1), the image processing unit 34, and various power source circuits and driving circuits (not illustrated), and controls the entire copier 1.

On the lower side of the image forming portion 1B, the three sheet feeding trays 23_1, 23_2, and 23_3 are contained while being supported on right and left guide rails 24_1, 24_2, and 24_3. Sheets P are stored in the respective sheet feeding trays 23_1, 23_2, and 23_3 in a stacked state. The respective sheet feeding trays 23_1, 23_2, and 23_3 are configured to be guided on the guide rails 24_1, 24_2, and 24_3 so as to be freely drawn out to be replenished with the sheets P.

The sheets P are fed out by a pickup roller 25 from the sheet feeding tray (herein, the sheet feeding tray 23_1 for example) designated by an operation of the display operation unit 14 (see FIG. 1) among these three sheet feeding trays 23_1, 23_2, and 23_3. The sheets P are separated one by one by a separation roller 26. The one sheet P is transported upward by a transport roller 27, and a transport timing is adjusted by a standby roller 28. The sheet P is further transported upward. The transport of the sheet after the standby roller 28 will be described below.

In the center portion of the image forming portion 1B, four image forming units 50Y, 50M, 50C, and 50K which form the toner images using the respective color toners of Y, M, C, and K are disposed. These four image forming units 50Y, 50M, 50C, and 50K have the same configuration except that the color of the used toner is different. Therefore, the description herein will be made using the image forming unit 50Y.

The image forming unit 50Y includes a photoconductor 51 which rotates in a direction depicted by arrow B in FIG. 2. A charging unit 52, a developing device 53, a cleaner 55, and a static eliminator 56 are disposed around the photoconductor 51. A transfer unit 54 is provided at a position where an intermediate transfer belt 61 described below is interposed in coorporation with the photoconductor 51.

The photoconductor 51 is formed in a roll shape, and holds an electrostatic latent image on its surface by being charged or discharged.

The charging unit 52 charges the surface of the photoconductor 51 with a charging potential.

The image forming portion 1B includes the exposure unit 42. In the exposure unit 42, the image signal is input from the exposure controller 41. The exposure light beams 421Y, 421M, 421C, and 421K are modulated according to the input image signal and emitted. After being charged by the charging unit 52, the photoconductor 51 is irradiated with the exposure light beam 421Y from the exposure unit 42, and forms the electrostatic latent image on the surface of the photoconductor 51.

After the photoconductor 51 is irradiated with the exposure light beam 421Y and the electrostatic latent image is formed on the surface, the electrostatic latent image is developed by the developing device 53. A toner image (a yellow (Y) toner image in the case of the image forming unit 50Y) is formed on the surface of the photoconductor 51.

The developing device 53 includes two augers 532_1 and 532_2 for agitating the developer and a developing roller 533 which carries the developer to a position facing the photoconductor 51 in a case 531 which contains a developer made of a toner and a carrier therein. When the electrostatic latent image formed on the photoconductor 51 is developed, a bias voltage is applied to the developing roller 533. The toner in the developer is attached onto the photoconductor 51 according to the electrostatic latent image formed on the photoconductor 51 by the operation of the bias voltage. The toner image is formed.

The toner image formed on the photoconductor 51 by the developing of the developing device 53 is transferred onto the intermediate transfer belt 61 by the operation of the transfer unit 54.

Furthermore, the residual toner on the photoconductor 51 after transferring is removed from the photoconductor 51 by the cleaner 55.

The static eliminator 56 emits the light to the area of the photoconductor 51 after the residual toner is removed by the cleaner 55. The photoconductor 51 is irradiated with the light from the static eliminator 56 so as to be neutralized. The static eliminator 56 is an example of the static elimination device according to an exemplary embodiment of the present invention, and an example of the static eliminator in the image forming apparatus according to an exemplary embodiment of the present invention. The photoconductor 51 is an example of a static elimination object body which is irradiated with the light to be neutralized in the static elimination device according to an exemplary embodiment of the present invention, and an example of an image holding member in the image forming apparatus according to an exemplary embodiment of the present invention.

The intermediate transfer belt 61 is an endless belt which suspended around plural rollers 62 and is circularly moved in a direction of arrow C.

The toner images formed on the image forming units 50Y, 50M, 50C, and 50K with the respective color toners are transferred onto the intermediate transfer belt 61 to be sequentially overlapped thereon. The toner images are transported to a secondary transfer position where a transfer unit 63 is disposed. In synchronization therewith, the sheet transported up to the standby roller 28 is transported to the secondary transfer position. The toner image on the intermediate transfer belt 61 is transferred onto the transported sheet by the operation of the transfer unit 63. The sheet with the toner image transferred is further transported. The toner image on the sheet is fixed to the sheet by pressing and heating of a fixing machine 64. The image made of the fixed toner image is formed on the sheet. The sheet with the image formed is further transported, and discharged onto the discharge tray 21 by a discharge roller 65.

The intermediate transfer belt 61 after being transferred with the toner image onto the sheet by the transfer unit 63 is further circularly moved. The toner left on the surface is removed from the intermediate transfer belt 61 by a cleaner 66.

Container mounting portions 29Y, 29M, 29C, and 29K are provided above the intermediate transfer belt 61 of the image forming portion 1B. Toner containers 67Y, 67M, 67C, and 67K are mounted in these container mounting portions 29Y, 29M, 29C, and 29K to contain the respective color toners of yellow (Y), magenta (M), cyan (C), and black (K). The respective color toners contained in these toner containers 67Y, 67M, 67C, and 67K are replenished to the respective developing devices 53 according to consumption of the toner in the corresponding developing devices 53.

Figure 3:
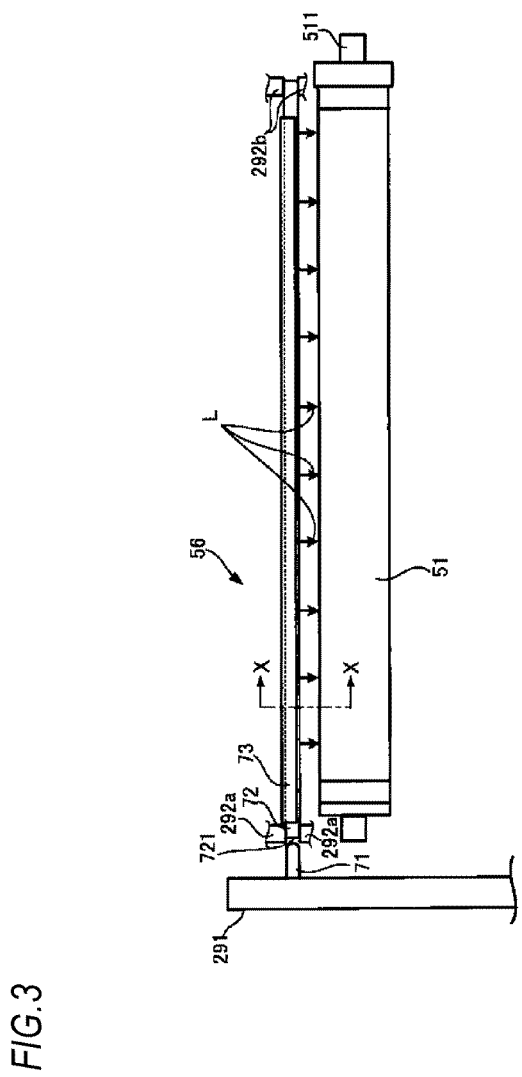
FIG. 3 is a diagram illustrating a static eliminator provided in the image forming apparatus of FIGS. 1 and 2 and a photoconductor adjacent to the static eliminator.
Figure 4:
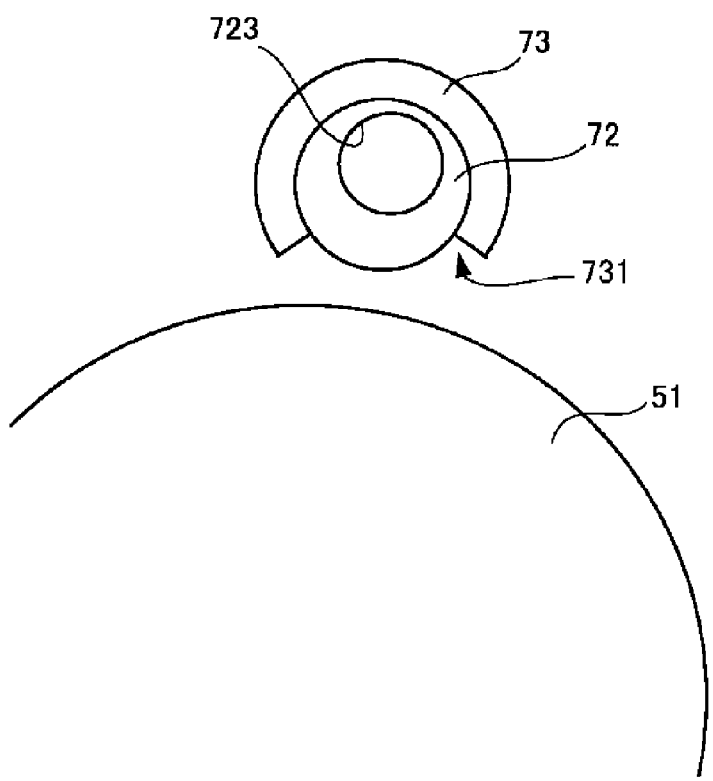
FIG. 4 is an enlarged view taken along a line X-X of FIG. 3.

FIG. 3 is a diagram illustrating the static eliminator provided in the image forming apparatus of FIGS. 1 and 2 together with the photoconductor adjacent to the static eliminator. FIG. 4 is an enlarged view taken along a line X-X of FIG. 3.

The static eliminator 56 includes a light source 71, a light guide body 72, and a reflector 73. The light source 71 is made of an LED (Light Emitted Diode) for example, and emits the light at a predetermined emission angle. The light source 71 is fixed to a support member 291 which is fixed to a housing of the image forming portion 1B (see FIGS. 1 and 2).

The light guide body 72 extending in a rod shape along the photoconductor 51, and guides light of the light source 71 incident from an end surface 721 thereof to emit the light from the circumferential surface thereof. Both end portions of the light guide body 72 are supported to support members 292a and 292b which are fixed to the housing of the image forming portion 1B (see FIGS. 1 and 2) similarly to the light source 71.

The reflector 73 includes an opening 731 on the facing surface side of the light guide body 72, which faces the photoconductor 51 as illustrated in FIG. 4. The reflector 73 surrounds the light guide body 72 except the facing surface side, and reflects the light emitted from the light guide body 72 toward the reflector 73. Therefore, the light which is emitted from the light source 71 and incident on the light guide body 72 is progressed into the light guide body 72 while being emitted and irradiates the photoconductor 51 as illustrated with arrow L in FIG. 3. In other words, the light emitted toward the photoconductor 51 by the light guide body 72 directly irradiates the photoconductor 51. The light emitted toward the reflector 73 is reflected on the reflector 73 and irradiates the photoconductor 51 through the light guide body 72 again.

In this way, entire parts in a rotational axis direction of the photoconductor 51 are irradiated with the light and neutralized.

Herein, the light guide body 72 is formed with a hollow portion 723 having a circular shape in cross-sectional view as illustrated in FIG. 4. The light guide body 72 is an example of the light guide body according to an exemplary embodiment of the present invention. Hereinafter, the description will be made about the light guide body 72.

Figure 5B:
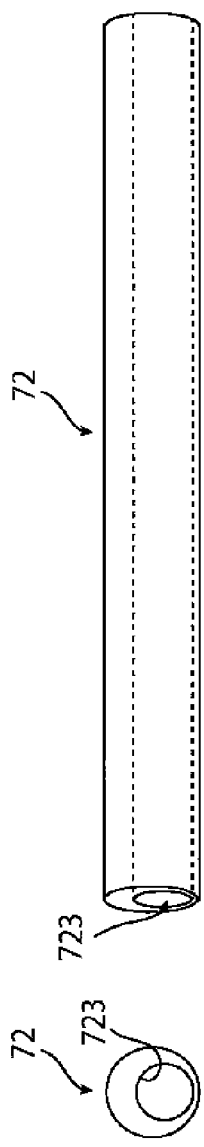
FIGS. 5A and 5B are a side view and a front view, respectively illustrating a light guide body of FIGS. 3 and 4.
Figure 5A:
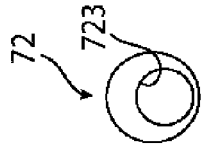

FIGS. 5A and 5B are a side view and a front view, respectively illustrating the light guide body of FIGS. 3 and 4.

The light guide body 72 is formed in a rod shape which has a circular cross-section and extends in a rod shape. The light guide body 72 internally includes the hollow portion 723 which has a circular cross-section and is extended longitudinally. The hollow portion 723 is disposed such that the center of the cross-sectional circle thereof is shifted from the center of the outer circle. Therefore, the light guide body 72 has a different wall thickness according to an angle in a circumferential direction around the light guide body 72. Since the wall thickness of the light guide body 72 is different according to the angle in the circumferential direction, the light is emitted in a direction of the angle by the amount of light according to the direction of the angle. Therefore, the light guide body 72 is configured such that the amount of light emission to the photoconductor 51 becomes different according to an angular portion which has a certain wall thickness of the light guide body 72 and is exposed from the opening 731 of the reflector 73 to face the photoconductor 51 even considering the light reflected on the reflector 73.

When the copier 1 is installed for the first time, the angular portion having a thick wall of the light guide body 72 is disposed to face the photoconductor 51 as illustrated in FIG. 4. According to a usage, the angular direction of a thin wall is gradually turned to face the photoconductor 51 regularly or irregularly. In this way, when the photoconductor 51 is degraded with time, a strong light is emitted to the photoconductor 51 according to a degree of the degradation. Therefore, the photoconductor 51 is sufficiently neutralized over a long time period, and generation of a ghost can be suppressed.

Herein, when the light is emitted to the photoconductor 51, the photoconductor 51 is degraded by the emitted light. Therefore, it is avoided that a strong light is emitted to the photoconductor 51 from the beginning. The amount of emission light is weakened, and the degradation of the photoconductor 51 is suppressed by setting the time period to sufficiently neutralize the photoconductor 51 with a weak light.

According to the light guide body 72 illustrated in FIGS. 5A and 5B, the amount of light emitted from the circumferential surface is continuously changed according to a circumferential direction around the light guide body 72. Therefore, the amount of light is finely adjusted by finely adjusting the angle, or the amount of light can be continuously changed by continuously changing the angle.

FIGS. 6A and 6B are a side view and a front view, respectively illustrating a light guide body according to another exemplary embodiment of the present invention.

A number of projections 725 are formed on the outer surface of a light guide body 72' illustrated in FIG. 6B. The light guide body 72' has a shape which has a circular cross-section and is extended in a rod shape similarly to the light guide body 72 illustrated in FIGS. 5A and 5B except these projections 725. The light guide body 72' is internally formed with a hollow portion 724 which has a circular cross-section and is extended longitudinally. The center of the hollow portion 724 of the light guide body 72' illustrated in FIG. 6A is matched to the center of the outer circle. Therefore, the wall thickness is the same at any angle in a circumference direction around the light guide body 72' except a number of projections 725.

Herein, the projections 725 formed in the light guide body 72' are arranged in an extending direction of the light guide body 72' at each of plural angles (herein, four angles by 90°) in a circumferential direction around the light guide body 72', and forms a projection row 726 for each angle. Then, the projection rows 726 are configured such that an interval of plural projections 725 included in each projection row 726 is different in each projection row 726. Therefore, when the light is incident from the end portion of the light guide body 72', the light is attenuated by the projection 725. In the angular direction where the projection row is provided such that the projections 725 are densely arranged, the light is significantly attenuated by the projection row 726 and the weak light is emitted. In the angular direction where the projection row 726 is provided such that the projections 725 are roughly arranged, the light is slightly attenuated by the projection row 726 and the strong light is emitted.

In the copier 1 illustrated in FIG. 1, the light guide body 72' illustrated in FIGS. 6A and 6B may be employed in place of the light guide body 72 illustrated in FIGS. 5A and 5B. When the copier 1 is used for the first time, the light guide body 72' is provided such that the projection row 726 where the projections 725 are densely arranged comes to face the photoconductor 51. The light guide body 72' may be adjusted such that the projection row 726 having an interval of the widely arranged projections 725 slowly comes to face the photoconductor 51.

According to the light guide body 72' illustrated in FIG. 6B, since the projections 725 are provided, holes are provided in the support member supporting the light guide body 72' in correspondence with the projections 725. Therefore, the angle of the circumferential direction can be easily adjusted with a high accuracy, and the angle can be stably secured.

Figure 7:
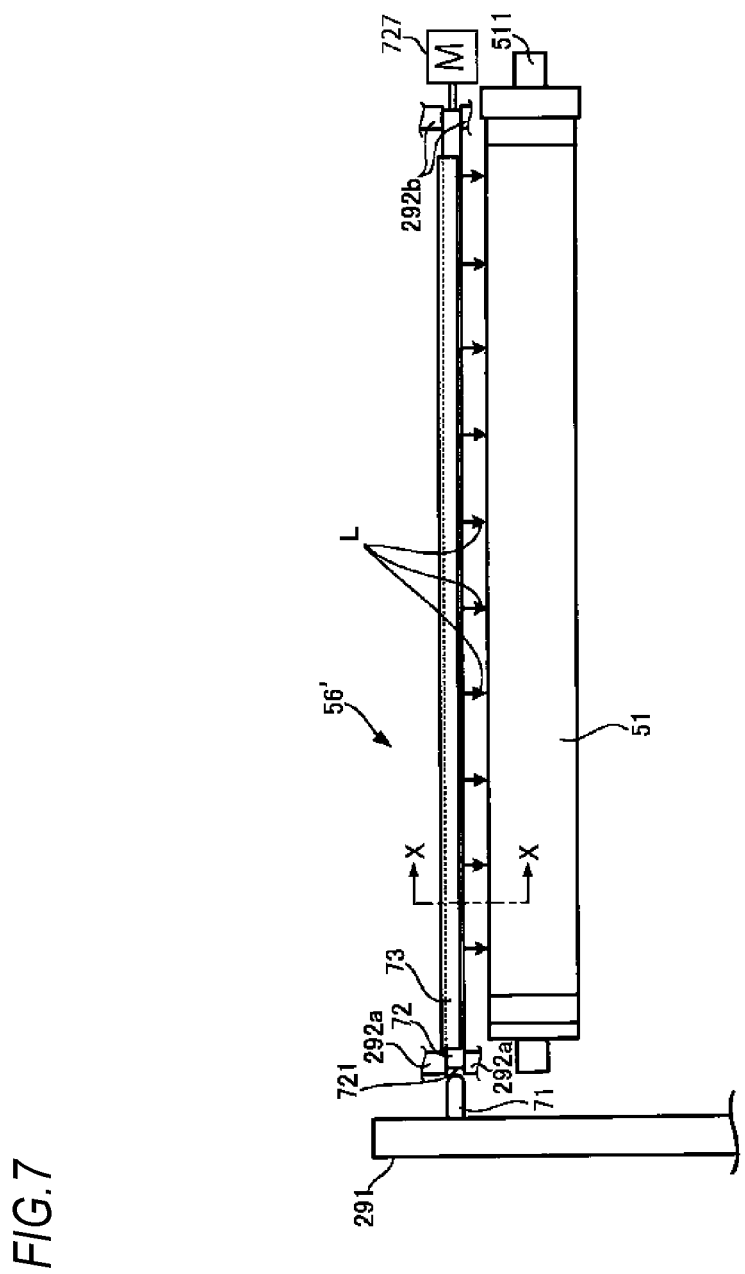
FIG. 7 is a diagram illustrating a static eliminator of another example.

FIG. 7 is a diagram illustrating a static eliminator of another example. In FIG. 7, the same components as those of the static eliminator illustrated in FIG. 3 will be assigned with the same symbols denoted in FIG. 3, and the description will be made only about a difference.

In a static eliminator 56' illustrated in FIG. 7, a motor 727 is provided to rotate the light guide body 72. The motor 727 receives a command from the main controller 40 (see FIG. 1) to rotate the light guide body 72, and adjusts the angular direction of the light guide body 72 to face the photoconductor 51.

FIG. 8 is a diagram illustrating a table which is stored in the main controller for adjusting the angle of the light guide body.

In the table illustrated in FIG. 8, the angle of the light guide body 72 is stored in association with the number of print copies.

When the copier 1 is operated for the first time, the light guide body 72 faces the photoconductor 51 in a direction of an angle of 0° at which the thickness of the wall is maximized. When the number of print copies of the copier 1 reaches 100,000, the main controller 40 issues a command to the motor 727 to rotate the light guide body 72 such that the light guide body 72 faces the photoconductor 51 in an angular direction of 45° of the light guide body 72. Hereinafter, similarly, when the number of print copies reaches 1,000,000, the light guide body 72 is rotated by the motor 727 such that the light guide body 72 faces the photoconductor 51 in a direction of an angle of 180° at which the thickness of the wall is minimized.

As in the example, the direction of the light guide body 72 may be configured to be automatically changed.

When the direction of the light guide body 72 is automatically changed, the direction may be changed not only according to the number of print copies, but also according to an operating time of the copier 1 or the photoconductor 51, an elapsed time after the copier 1 is installed and starts its operation, or an operating time or an elapsed time after the photoconductor 51 is replaced with a new photoconductor 51. Various histories or elapsed times of the copier 1 or the photoconductor 51 may be used as an index to give a timing for changing the direction of the light guide body.

The description herein has been made about the light guide body using two examples illustrated in FIGS. 5 and 6. The light guide body of the present invention is not limited to the shapes illustrated in FIGS. 5 and 6. Any shape may be applied as long as the amount of emitting light to the direction of the angle is changed according to the angle of the circumferential direction around the light guide body.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light guide body that extends in a rod shape and guides light incident from an end surface thereof to emit the light from a circumferential surface thereof, the light guide body having a shape such that according to an angle of a circumferential direction around the light guide body, an amount of emitting light in a direction of the angle is different, wherein the light guide body comprises
a projection row that is provided in each of a plurality of angles in the circumferential direction around the light guide body and includes a plurality of projections arranged in an extending direction of the light guide body at an interval according to each of the plurality of angles,
wherein the light is emitted in the direction of the angle by the amount of light according to the interval of the arranged projections of the direction of the angle.

2. A static elimination device comprising:
a light guide body that extends in a rod shape, is disposed along a static elimination object body which is irradiated with light to be neutralized and guides light incident from an end surface thereof to emit the light from a circumferential surface thereof;
a light source that emits light to be incident on the end surface of the light guide body; and
a reflector that is formed with an opening on a facing surface side facing the static elimination object body, surrounds an area of the light guide body except the facing surface side of the light guide body, and reflects the light emitted from the light guide body,
wherein the light guide body has a shape such that according to an angle of a circumferential direction around the light guide body, an amount of emitting light in a direction of the angle is different; and
wherein the light guide body is provided rotatably about a rotation axis of the light guide body so that a part of the light guide body exposed from the opening of the reflector is changed by the rotation of the light guide body.

3. An image forming apparatus comprising:

an image holding member that is formed thereon with an electrostatic latent image while rotating about a rotation axis thereof, holds a toner image developed at a developing position and transfers the toner image to a transfer destination at a transfer position;

a developing device that develops the electrostatic latent image on the image holding member at the developing position to form the toner image on the image holding member;

a transfer unit that transfers the toner image on the image holding member onto the transfer destination at the transfer position; and a static eliminator that is disposed in a proximity of an area on the image holding member after transferring and neutralizes the image holding member by irradiating the area with light, and wherein the static eliminator comprises:

a light guide body that extends in a rod shape, is disposed along the image holding member and guides light incident from an end surface thereof to emit the light from a circumferential surface thereof, the light guide body having a shape such that according to an angle of a circumferential direction around the light guide body, an amount of emitting light in a direction of the angle is different, wherein the light guide body is provided rotatably about a rotation axis of the light guide body so that a part of the light guide body exposed from the opening of the reflector is changed by the rotation of the light guide body;

a light source that emits light to be incident on the end surface of the light guide body; and a reflector that is formed with an opening on a facing surface side facing the image holding member, surrounds an area of the light guide body except the facing surface side of the light guide body, and reflects the light emitted from the light guide body.

4. An image forming apparatus comprising:

an image holding member that is formed thereon with an electrostatic latent image while rotating about a rotation axis thereof, holds a toner image developed at a developing position and transfers the toner image to a transfer destination at a transfer position;

a developing device that develops the electrostatic latent image on the image holding member at the developing position to form the toner image on the image holding member;

a transfer unit that transfers the toner image on the image holding member onto the transfer destination at the transfer position; and a static eliminator that is disposed in a proximity of an area on the image holding member after transferring and neutralizes the image holding member by irradiating the area with light, and wherein the static eliminator comprises:

a light guide body that extends in a rod shape, is disposed along the image holding member and guides light incident from an end surface thereof to emit the light from a circumferential surface thereof, the light guide body having a shape such that according to an angle of a circumferential direction around the light guide body, an amount of emitting light in a direction of the angle is different;

a light source that emits light to be incident on the end surface of the light guide body;

a reflector that is formed with an opening on a facing surface side facing the image holding member, surrounds an area of the light guide body except the facing surface side of the light guide body, and reflects the light emitted from the light guide body; and an angle changing unit that changes an angle of the circumferential direction around the light guide body according to an elapsed time or a history of the image forming apparatus or the image holding member.

* * * * *